United States Patent
Kim et al.

(10) Patent No.: US 9,741,497 B2
(45) Date of Patent: Aug. 22, 2017

(54) BETA-ALUMINA AND ALPHA-ALUMINA BONDING METHOD USING ALPHA-ALUMINA AND CALCIUM OXIDE AND THERMAL TO ELECTRIC CONVERTER USING THE SAME

(71) Applicant: KOREA INSTITUTE OF ENERGY RESEARCH, Daejeon (KR)

(72) Inventors: Se-Young Kim, Seongnam-si (KR); Sang-Kuk Woo, Daejeon (KR); Sun-Dong Kim, Daejeon (KR); Jong-Hoon Joo, Chungcheongbuk-do (KR); In-Sub Han, Daejeon (KR); Doo-Won Seo, Daejeon (KR); Ji-Haeng Yu, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 700 days.

(21) Appl. No.: 14/178,239

(22) Filed: Feb. 11, 2014

(65) Prior Publication Data

US 2014/0224292 A1    Aug. 14, 2014

(30) Foreign Application Priority Data

Feb. 13, 2013    (KR) ........................ 10-2013-0015116

(51) Int. Cl.
*H01L 35/30* (2006.01)
*H01G 9/21* (2006.01)
*H01G 9/00* (2006.01)

(52) U.S. Cl.
CPC ............. *H01G 9/21* (2013.01); *H01G 9/0029* (2013.01); *Y10T 156/10* (2015.01)

(58) Field of Classification Search
None
See application file for complete search history.

(56) References Cited

U.S. PATENT DOCUMENTS 5,954,900 A * 9/1999 Hegner ................. C04B 35/645
156/306.6
5,998,728 A * 12/1999 Sievers .................... H01G 9/21
136/201

FOREIGN PATENT DOCUMENTS

JP    2001-035527 A    2/2001
KR    10-0838612 B1    6/2008

* cited by examiner

*Primary Examiner* — Eli Mekhlin
(74) *Attorney, Agent, or Firm* — Revolution IP, PLLC

(57) ABSTRACT

Disclosed is an insulating bonding part for bonding to a solid electrolyte including beta-alumina, the insulating bonding part comprising a plurality of layers which have different mixing ratios of the alpha-alumina and CaO, wherein the layer closer to the solid electrolyte including the beta-alumina has a higher ratio of the CaO, and wherein the layer farther from the solid electrolyte including the beta-alumina has a higher ratio of the alpha-alumina.

3 Claims, 5 Drawing Sheets

FIG. 3

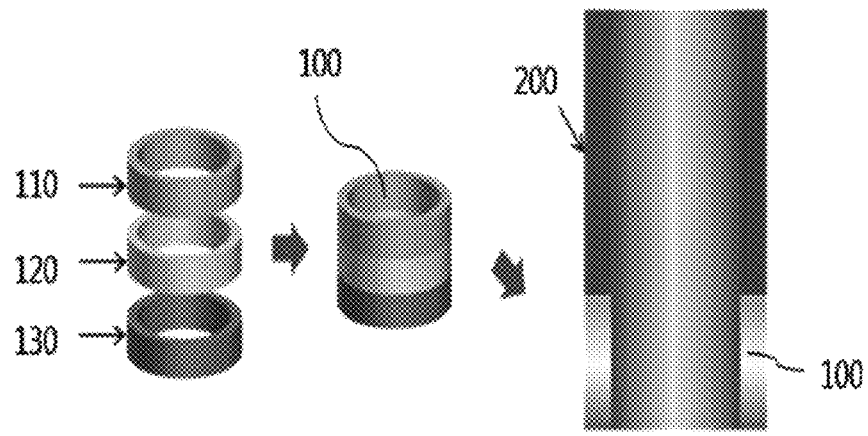

FIG. 4

(i) SELECTING AT LEAST ONE OF POWDER OF THE ALPHA-ALUMINA AND CaO, A POWDER MOLDED BODY AND PASTE AS A BOND FOR BONDING THE SOLID ELECTROLYTE INCLUDING THE BETA-ALUMINA AND THE INSULATION LAYER INCLUDING THE ALPHA-ALUMINA

↓

(ii) INSERTING THE SELECTED BOND FORMED BY THE MIXTURE OF THE ALPHA-ALUMINA AND CaO BETWEEN THE SOLID ELECTROLYTE INCLUDING THE BETA-ALUMINA AND THE INSULATION LAYER INCLUDING THE ALPHA-ALUMINA

↓

(iii) INDUCING BONDING OF THE SOLID ELECTROLYTE INCLUDING THE BETA-ALUMINA, THE INSULATION LAYER INCLUDING THE ALPHA-ALUMINA AND THE BOND FORMED BY THE MIXTURE OF THE ALPHA-ALUMINA AND CaO

BETA-ALUMINA AND ALPHA-ALUMINA BONDING METHOD USING ALPHA-ALUMINA AND CALCIUM OXIDE AND THERMAL TO ELECTRIC CONVERTER USING THE SAME

CROSS REFERENCE TO PRIOR APPLICATIONS

This application claims priority under 35 U.S.C. §119 to Korean Patent Application No. 10-2013-0015116, filed on Feb. 13, 2013, which is hereby incorporated by reference in its entirety.

BACKGROUND

Field

The present invention relates to an alkali metal thermal to electric converter (AMTEC) and a technology applicable to a battery using β"-alumina electrolyte and to a power plant, and more particularly to an essential technology for bonding β"-alumina to α-alumina, for insulation and structural stability in using β"-alumina, that is to say, a bond having stability and a bonding method.

Description of Related Art

An Alkali metal thermal to electric converter (AMTEC) is a thermal to electric power generator capable of generating electrical energy from thermal energy.

When a temperature difference is given to both ends of an ionically conductive Beta-Alumina Solid Electrolyte (BASE), Na charged in the cell is ionized into Na+ due to the vapor pressure difference of Na, and then is neutralized. Electricity is generated during this process.

In this case, low voltage and high current are generated. So, when the cells are modularized by being connected in series or in parallel, a large amount of electric power can be generated.

The development of alkali metal thermal to electric converter (AMTEC) technology has started for the purpose of an electric power source for space. The AMTEC has a high power density per unit area and high efficiency, and maintains stability.

The AMTEC uses a variety of heat sources, for example, solar energy, fossil fuel, waste heat, terrestrial heat, nuclear reactor, etc. The AMTEC is comprised of electric power generation cells capable of generating electricity without using a driver such as a turbine, a motor or the like, so that it can directly generate electricity from a portion contacting with the heat. When the AMTEC is formed in the form of a module in series or in parallel, a great amount of electricity of several KW to several hundredths MW can be generated.

At present, through a technology of collecting the waste heat, the waste heat is collected in the form of heat water, combustion air, etc., by using a heat exchanger, a waste heat boiler or the like.

The AMTEC is capable of improving the efficiency by directly generating high-quality electricity. Therefore, the AMTEC is now issued as a promising technology replacing the existing technologies.

One of the characteristics of the AMTEC power generation technology is to have a simpler structure and higher energy conversion efficiency than those of other thermal to electric converting elements.

Particularly, compared with a solar thermal power plant, the AMTEC power generation technology does not require a mechanical driver such as a turbine, etc. Compared with a thermoelectric device, the AMTEC power generation technology can be applied to a high capacity, a high efficiency system.

The process of generating electricity in the AMTEC will be specifically described. After the state of Na vapor is changed into a vapor state in a high temperature and high pressure evaporator by a heat source, Na+ passes through beta-alumina solid electrolyte (BASE), and free electrons return to a cathode through an electric load from an anode, and then are recombined with ion generated from the surface of a low temperature and low pressure BETA and then is neutralized. Electricity is generated during this process.

The vapor pressure of Na plays the most significant role in a thermal to electric power generator as an energy source or a driving force which generates electricity. Also, free electrons generated during a process in which Na passes through the solid electrolyte due to a concentration difference and temperature difference of a working fluid are collected through electrodes, so that electricity can be generated.

The beta-alumina and Na super-ionic conductor (NASICON) may be used as the solid electrolyte.

However, when NASICON is exposed at a high temperature for a long time, there is a problem in the stability thereof.

The beta-alumina includes two kinds of beta'-alumina and beta"-alumina.

The beta"-alumina has a more improved layer structure so that the conductivity of the Na+ ion is much better. Therefore, the beta"-alumina is now generally used.

A process is repeated in which the neutral Na vapor is condensed by being cooled on the inner surface of a low pressure condenser and is transferred to an evaporator by a capillary wick, and then is changed into a vapor state again. Generally, the temperature of the evaporator is in a range of 900 K to 1,100 K, and the temperature of the condenser in a range of 500 K to 600 K.

It is possible for the efficiency of the thermal to electric power generation of the AMTEC to be up to 40%. The AMTEC power generation technology has a high power density and a simple structure requiring no separate driver.

PRIOR DOCUMENT (Patent document 1) In Korean Patent No. 10-0838612, disclosed is a method for forming a complex structure by bonding at least two sintered bodies. In more detail, the method includes: providing a bonding material between bonding surfaces of the first sintered body and the second sintered body; providing an aggregate by applying a pressure from 1 kPa to 5 Mpa; heating the aggregate at a conforming temperature sufficient to allow the bonding material to be suitable for the bonding surface; and heating additionally the aggregate at a bonding temperature less than and not equal to the minimum sintering temperature of the first and second sintered bodies. The bonding material includes an organic component and ceramic particles. The ceramic particles constitute 40 to 75 volume % of the bonding material. The complex structure manufactured by a method including at least one of the components of the first or second sintered body is also disclosed. However, when β"-alumina is used for a technology applicable to a battery using β"-alumina electrolyte and to a power generation equipment, there still exists a problem in that β"-alumina is not bonded to α-alumina for the purpose of insulation and structural stability.

TECHNICAL PROBLEM

Generally, a bond such as brazing, glass, ceramic and the like is used for bonding alpha-alumina and beta-alumina.

However, such a hetero-bond has fundamental problems, for example, a very low stability due to a thermal expansion difference and a basic property difference, etc., from the bond.

The glass sealant has an excellent bonding force and a simple process. However, the glass sealant is degraded at the time of reacting with Na and is not available at a temperature of 800° C.

The metal brazing has an excellent bonding force and is available at a temperature of 800° C. However, the metal brazing brings about cracks caused by a thermal gradient process.

Regarding $Al_2O_3$ reaction bonding, the same material as that of a bonding basic material is used. However, a bonding force thereof is weak.

Particularly, degradation of a bonding portion under the circumstances of a high temperature and Na, etc., may act as a weakness for a long-term stability of a battery and a power generation system. A residual stress, etc., in a bonding process may be a cause of weakening the entire system.

TECHNICAL SOLUTION

In order to solve the above problems, powder formed by the mixture of the alpha-alumina and CaO is used as a basic bond for the purpose of bonding the alpha-alumina and the beta-alumina in the present invention.

Looking more closely, the present invention proposes a technique which manufactures alpha-alumina integral bonding parts by the mixture of the alpha-alumina and CaO in the bonding of the alpha-alumina to the beta-alumina, so that it is not necessary to separately bond the alpha-alumina.

Also, the present invention proposes a technique which is used for direct alpha-beta-alumina bonding by applying the mixed powder of the alpha-alumina and CaO between the beta-alumina and the alpha-alumina This method uses the fact that when the mixed powder of the alpha-alumina and CaO is heated at a temperature of 1,300 to 1,500° C., the mixed powder forms a eutectic point to be molten at a temperature lower than that of a common alumina, thereby inducing the bonding of the alpha-alumina and the beta alumina.

ADVANTAGEOUS EFFECT

The bond of the alpha-alumina and CaO proposed by the present invention is formed of a material the same as the alpha-alumina and the beta alumina based material and has no big thermal expansion difference or no big property difference from the alpha-beta alumina based material. Therefore, the bond of the alpha-alumina and CaO shows excellent bonding stability after the bonding.

Also, the bonding technique of the present invention, which uses the alpha-alumina integral bonding parts, does not have to separately bond the alpha-alumina for insulation and does never have heterogeneity, thus shows the excellent bonding stability.

Also, it has been shown that there is no problem in the stability of the bond of the alpha-alumina and CaO despite the long-term exposure to Na. Therefore, the bond of the alpha-alumina and CaO is expected to greatly contribute to the applications of the AMTEC and NAS, etc.

When the bond of the alpha-alumina and CaO is used as a bond between the alpha-alumina and beta-alumina, the bond is heat-treated at a temperature of from 1,300 to 1,500° C. Therefore, there is an effect that sufficient stability is obtained when the bond is used at a temperature lower than the temperature.

Accordingly, when the bonding process is performed on the AMTEC of 800° C., the NAS of 300° C., etc., by means of the bonding parts consisting of alpha-alumina, a process cost and time can be reduced and the high temperature bonding stability can be improved by reducing the number of hetero-bonding surfaces.

BRIEF DESCRIPTION OF THE DRAWINGS

FIG. 3 shows a bonding structure replacing the insulation layer including the alpha-alumina with an insulating bonding part using the alpha-alumina and CaO by bonding the solid electrolyte including the beta-alumina to the insulating bonding part in accordance with the present invention;

FIG. 4 shows a method for bonding the solid electrolyte including the beta-alumina and the insulation layer including the alpha-alumina by using the bond of the alpha-alumina and CaO in accordance with the present invention;

DETAILED DESCRIPTION

Figure 1:
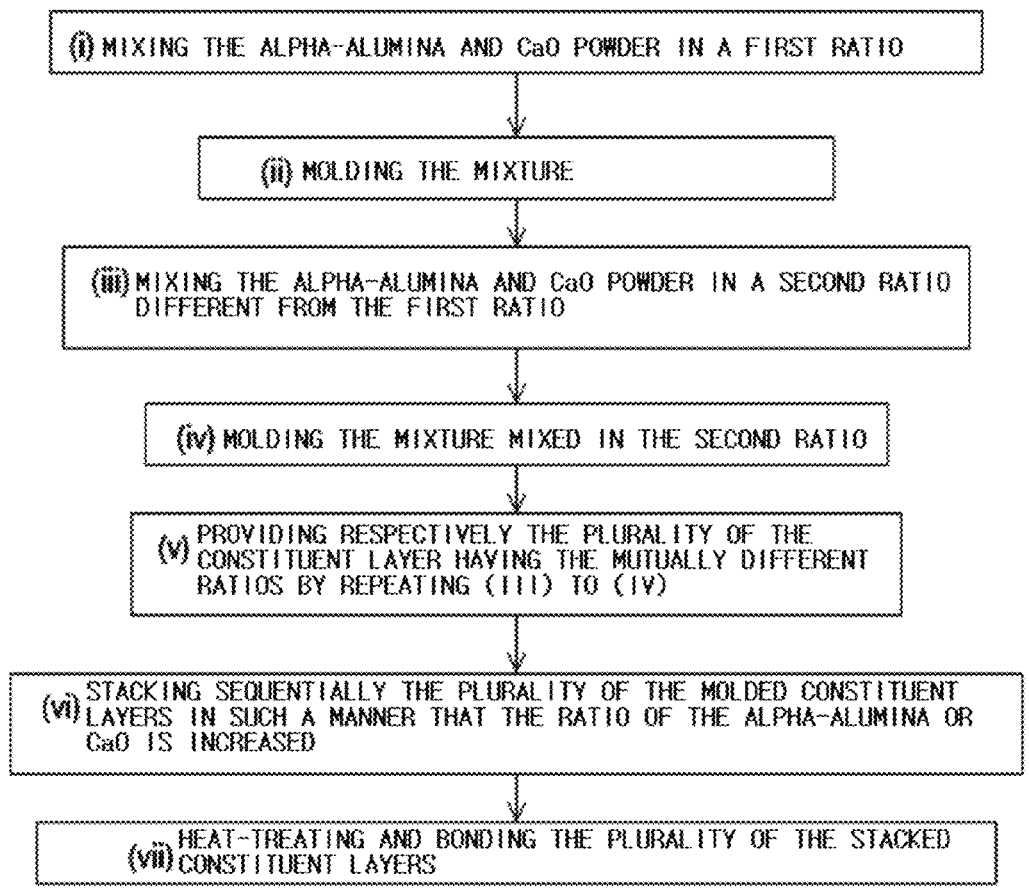
FIG. 1 shows a method for manufacturing an insulating bonding part using alpha-alumina and CaO in accordance with the present invention.

FIG. 1 shows a method for manufacturing an insulating bonding part 100 using alpha-alumina and CaO in accordance with the present invention.

The insulating bonding part 100 replacing an insulation layer including alpha-alumina by being bonded to a solid electrolyte 200 including beta-alumina includes a plurality of layers 110 to 130 which have different mixing ratios of the alpha-alumina and CaO. The layer closer to the solid electrolyte 200 including the beta-alumina has a higher ratio of the CaO, and the layer farther from the solid electrolyte 200 including the beta-alumina has a higher ratio of the alpha-alumina.

Therefore, the insulating bonding part 100 replaces finally the insulation layer including the alpha-alumina, so that it is not necessary to separately bond the insulation layer including the alpha-alumina.

The method for manufacturing the insulating bonding part 100 bonded to the solid electrolyte 200 including the beta-alumina includes: mixing the alpha-alumina and CaO powder in a first ratio; molding the mixture; mixing the alpha-alumina and CaO powder in a second ratio different from the first ratio; molding the mixture mixed in the second ratio; providing respectively the plurality of the constituent layer 110 to 130 having the mutually different ratios by repeating the above steps; stacking sequentially the plurality of the molded constituent layers 110 to 130 in such a manner that the ratio of the alpha-alumina or CaO is increased; and heat-treating and bonding the plurality of the stacked constituent layers.

The molding the mixture may be performed by at least any one of compression molding and cast in place pile (CIP) after filling the powder of the alpha-alumina and CaO.

Figure 2:
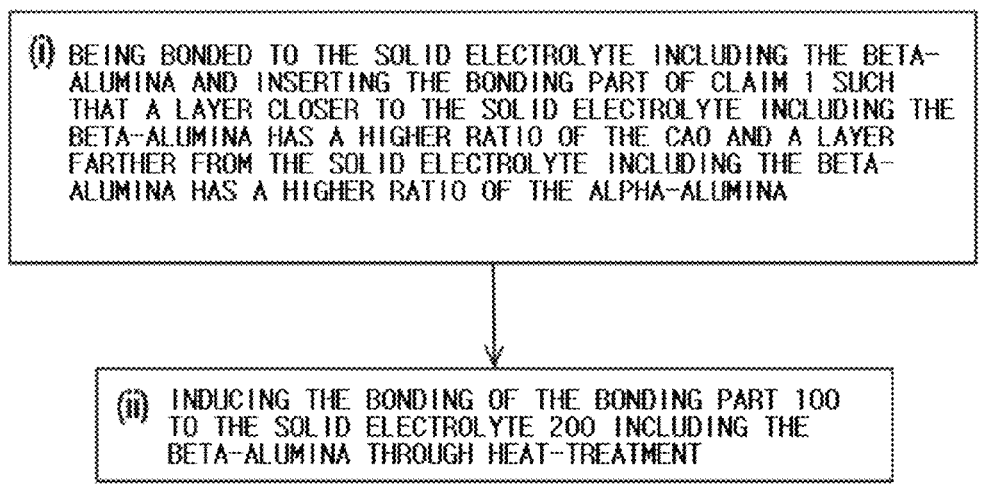
FIG. 2 shows a method for replacing an insulation layer including the alpha-alumina with an insulating bonding part using the alpha-alumina and CaO by bonding a solid electrolyte including beta-alumina to the insulating bonding part in accordance with the present invention.

A method for bonding the bonding part manufactured through the above process to the solid electrolyte 200 including the beta-alumina and for finally replacing the insulation layer including the alpha-alumina may include, as shown in FIG. 2, inserting the insulating bonding part 100 into the solid electrolyte 200 including the beta-alumina such that the layer closer to the solid electrolyte 200 including the beta-alumina has a higher ratio of the CaO and the layer farther from the solid electrolyte including the beta-alumina has a higher ratio of the alpha-alumina; and inducing the bonding of the insulating bonding part 100 to the solid electrolyte 200 including the beta-alumina through heat-treatment.

The insulating bonding part 100 using the alpha-alumina and CaO is able to replace the insulation layer including the alpha-alumina by being bonded to the solid electrolyte 200 including the beta-alumina. The insulating bonding part 100 and the bonding structure thereof can be found in FIG. 3.

The bonding structure that uses the insulating bonding part 100 using the alpha-alumina and CaO is a structure in which the bonding part is bonded to the solid electrolyte 200 including the beta-alumina. The insulating bonding part 100 is comprised of a plurality of the layers which have different mixing ratios of the alpha-alumina and CaO. The layer closer to the solid electrolyte 200 including the beta-alumina has a higher ratio of the CaO, and the layer farther from the solid electrolyte including the beta-alumina has a higher ratio of the alpha-alumina.

Another method for bonding the solid electrolyte 200 including the beta-alumina to the insulation layer including the alpha-alumina may include, as shown in FIG. 4, selecting at least one of the powder of the alpha-alumina and CaO, a powder molded body and paste as a bond for bonding the solid electrolyte 200 including the beta-alumina and the insulation layer 300 including the alpha-alumina; inserting the selected bond formed by the mixture of the alpha-alumina and CaO between the solid electrolyte 200 including the beta-alumina and the insulation layer 300 including the alpha-alumina; and inducing through heat-treatment the bonding of the solid electrolyte 200 including the beta-alumina, the insulation layer 300 including the alpha-alumina and the bond formed by the mixture of the alpha-alumina and CaO.

The heat-treatment for the induction of the bonding may be performed at a temperature of 1,100 to 1,700° C. More preferably, it is possible to perform the heat-treatment at a temperature of 1,300 to 1,500° C. However, there is no limit to this. The temperature is lower than a melting temperature of general alumina. Since it is possible for the alpha-alumina and CaO to form a eutectic point at the above temperature, the bonding can be performed at a temperature lower than the melting temperature of general alumina.

A bonding structure of the solid electrolyte 200 including the beta-alumina and the insulation layer 300 including the alpha-alumina is formed by bonding the bond formed by the mixture of the alpha-alumina and CaO between the solid electrolyte 200 including the beta-alumina and the insulation layer 300 including the alpha-alumina.

Figure 6:
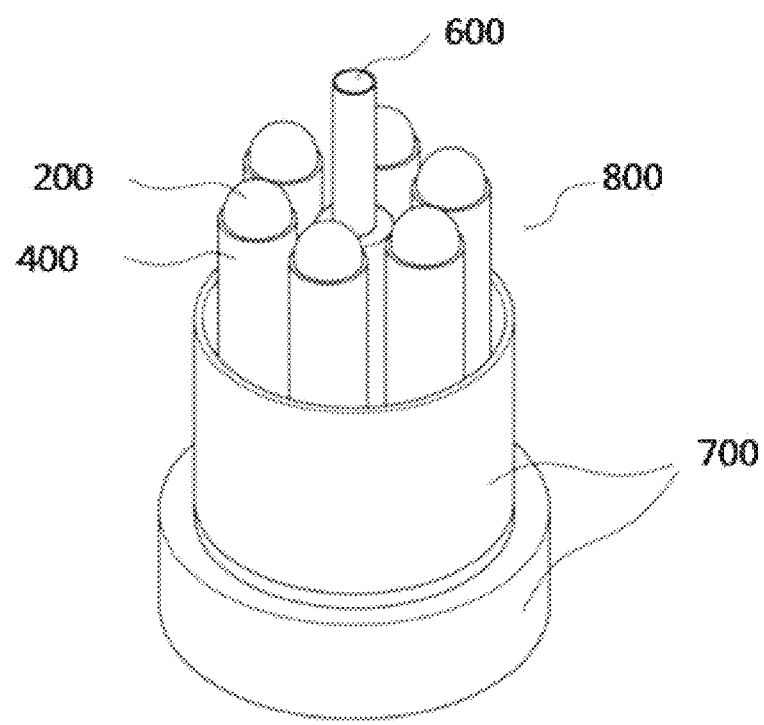
FIG. 6 shows a unit thermal to electric power generator which uses the thermal to electric power generation cell which includes the solid electrolyte including the beta-alumina and the insulation layer including the alpha-alumina in accordance with the present invention.

A metal support type unit thermal to electric power generator 800 using the bonding method may include, as shown in FIG. 6, a thermal to electric power generation cell 500, a case 700, a working fluid which is disposed within the case, a condenser which is disposed on the upper portion of the case and collects and condenses the working fluid which has passed through the thermal to electric power generation cell, an evaporator which is disposed on the lower portion of the case, transfers heat to the working fluid and converts into vapor and transfers the working fluid vapor to the thermal to electric power generation cell, a circulator 600 which connects the space between the condenser and evaporator and allows the working fluid to be transferred, and a bonding portion which bonds between the evaporator and the thermal to electric power generation cell.

The bonding portion has a bonding structure in which the solid electrolyte 200 including the beta-alumina is bonded on the upper portion of the bonding part 100 having a ratio change of the alpha-alumina and CaO.

Regarding the bonding part 100, the portion closer to the solid electrolyte including the beta-alumina has a higher ratio of the beta-alumina, and the portion farther from the solid electrolyte including the beta-alumina has a higher ratio of the alpha-alumina. Consequently, the bonding part 100 is able to replace the insulation layer including the alpha-alumina, so that the insulation layer including the alpha-alumina does not have to be separately used.

Another structure the bonding portion includes a structure in which the solid electrolyte 200 including the beta-alumina and the insulation layer 300 including the alpha-alumina are respectively bonded to the upper portion and lower portion of the bond of the alpha-alumina and CaO, which uses at least any one type of the powder, powder molded body and paste.

Figure 5:
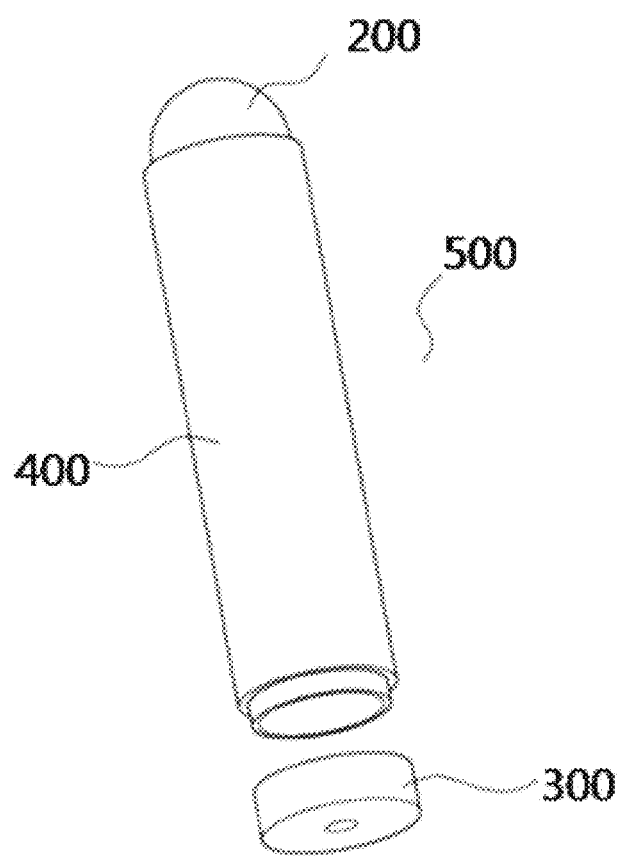
FIG. 5 shows a thermal to electric power generation cell which includes the solid electrolyte including the beta-alumina and the insulation layer including the alpha-alumina in accordance with the present invention.

The unit thermal to electric power generator 800 includes a plurality of the thermal to electric power generation cells 500. As shown in FIG. 5, the thermal to electric power generation cell 500 may include a tubular metal support, the solid electrolyte 200 which is formed on the surface of the metal support and includes the beta-alumina, and a porous electrode 400 formed on the surface of the solid electrolyte.

The present invention has been described with reference to the accompanying drawings. This is just one of various embodiments including the subject matter of the present invention and intends to allow those skilled in the art to easily embody the present invention. It is clear that the present invention is not limited to the above-described embodiments. Therefore, the scope of the present invention should be construed by the following claims. Without departing from the subject matter of the present invention, all the technical spirits within the scope equivalent to the subject matter of the present invention is included in the right scope of the present invention by the modifications, substitutions, changes and the like. Also, it is clear that some of the drawing configuration are intended for more clearly describing the configuration and are more exaggerated or shortened than the actual one.

What is claimed is:

1. An insulating bonding part for bonding to a solid electrolyte including beta-alumina, the insulating bonding part comprising:
   a plurality of layers which have different mixing ratios of alpha-alumina and CaO,
   wherein a layer closer to the solid electrolyte including the beta-alumina has a higher ratio of the CaO, and a layer furthest from the layer having a higher ratio of the CaO has a higher ratio of the alpha-alumina.

2. A metal support type unit thermal to electric power generator comprising:
- a thermal to electric power generation cell;
- a case;
- a working fluid which is disposed within the case;
- a condenser which is disposed on an upper portion of the case and collects and condenses the working fluid which has passed through the thermal to electric power generation cell;
- an evaporator which is disposed on a lower portion of the case, transfers heat to the working fluid and converts into vapor and transfers the working fluid vapor to the thermal to electric power generation cell;
- a circulator which connects a space between the condenser and evaporator and allows the working fluid to be transferred; and
- a bonding portion which bonds between the evaporator and the thermal to electric power generation cell,
- wherein the bonding portion comprises a plurality of layers which have different mixing ratios of alpha-alumina and CaO,
- wherein a layer of the bonding portion closer to a solid electrolyte including beta-alumina of the thermal to electric power generation cell has a higher ratio of the CaO, and a layer furthest from the layer having a higher ratio of the CaO has a higher ratio of the alpha-alumina.

3. The unit thermal to electric power generator of claim 2, wherein the thermal to electric power generation cell comprises:
- a tubular metal support;
- the solid electrolyte which is formed on a surface of the metal support and includes the beta-alumina; and
- a porous electrode formed on a surface of the solid electrolyte.

* * * * *